July 25, 1939. W. E. SMITH 2,167,285
GROMMET
Filed July 7, 1936 2 Sheets-Sheet 1
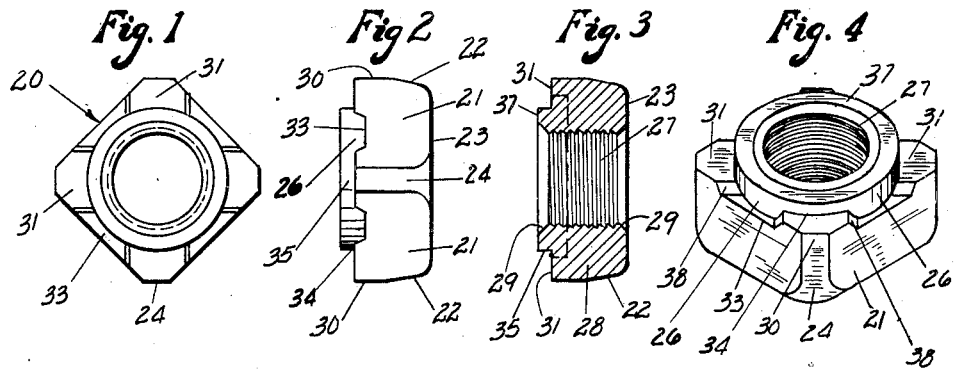
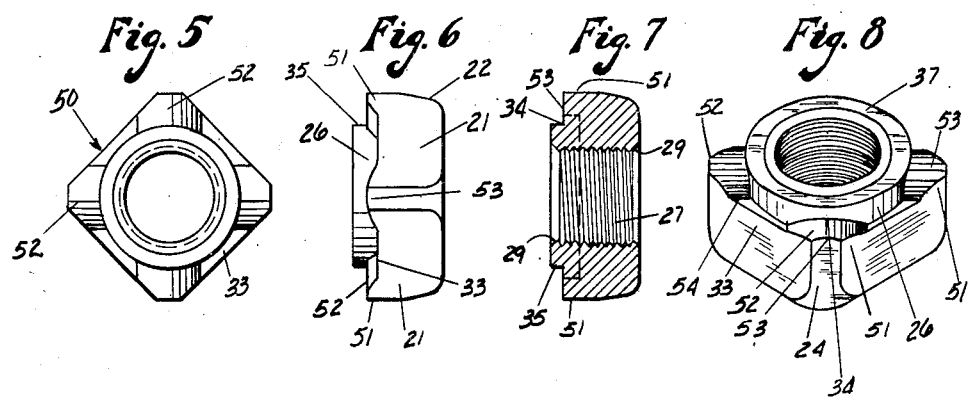
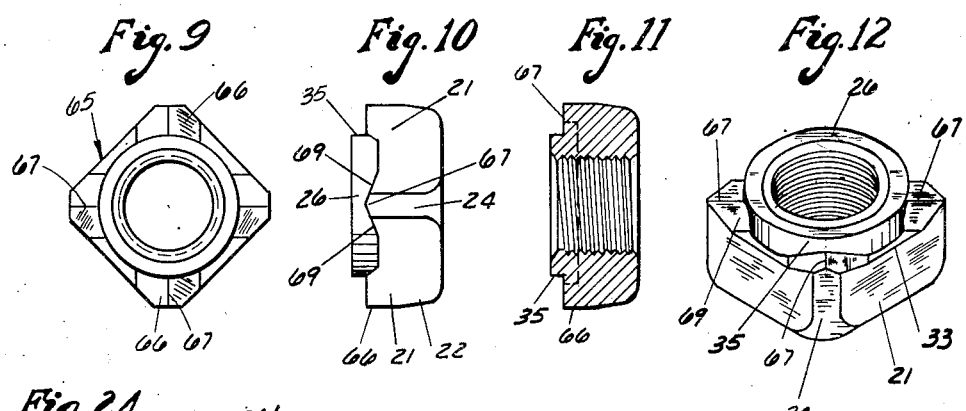
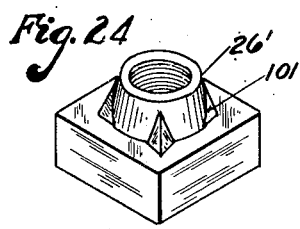
INVENTOR.
WILLIAM E. SMITH
BY
ATTORNEY.

July 25, 1939. W. E. SMITH 2,167,285
GROMMET
Filed July 7, 1936 2 Sheets-Sheet 2
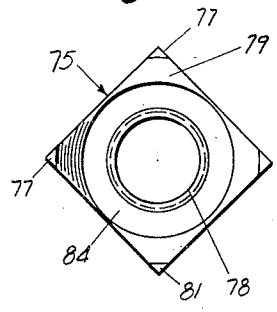
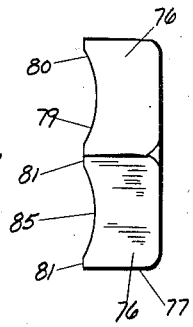
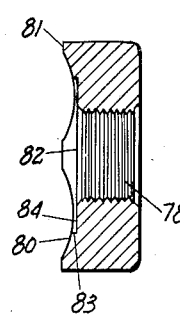
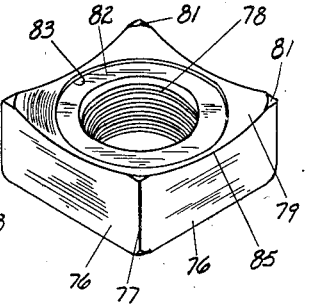
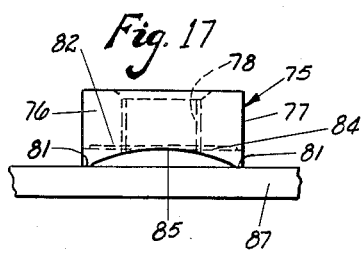
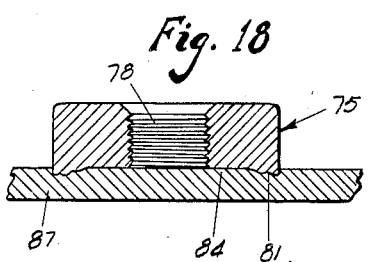
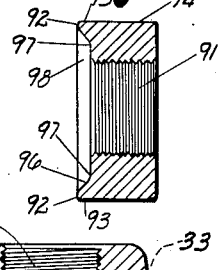
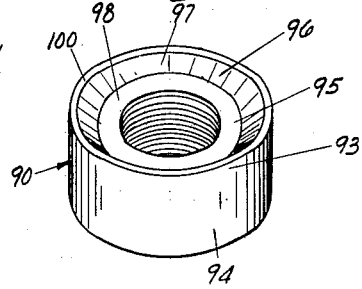
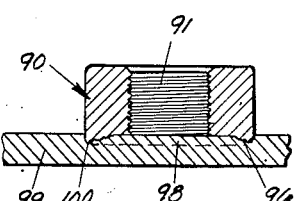
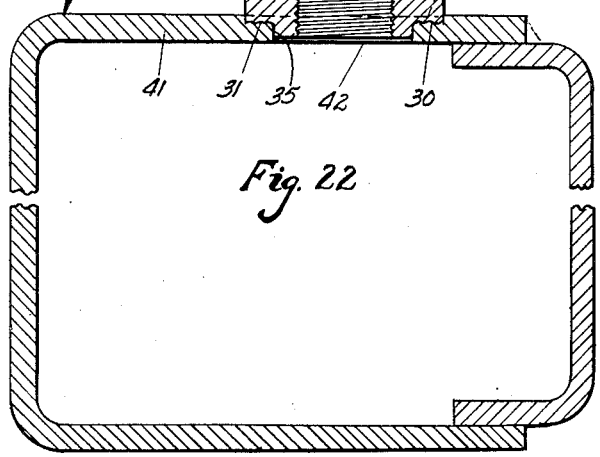
INVENTOR.
WILLIAM E. SMITH
BY Louis W. Kelmuth
ATTORNEY.

Patented July 25, 1939

2,167,285

UNITED STATES PATENT OFFICE 2,167,285

GROMMET

William E. Smith, Detroit, Mich., assignor to The Midland Steel Products Company, Cleveland, Ohio, a corporation of Ohio Application July 7, 1936, Serial No. 89,346

4 Claims. (Cl. 189—36)

This invention relates to grommets and clinch nuts and a method of attaching them to metal plates whereby parts may be mounted with respect to the metal plates by attachment to the grommets or nuts.

An object of the invention is to provide a grommet having spaced relatively large welding projections extending from the periphery of the grommet towards the aperture therein.

Another object of the invention is to provide a grommet having an annular pilot and spaced welding projections of relatively large surface area extending from the periphery of the grommet to the pilot, whereby the cross sectional area of the weld will be relatively large.

A further object of the invention is to provide a grommet having an annular welding projection extending from the outer peripheral wall thereof to a point short of the aperture in the grommet for welding to a plate to produce a fluid tight seal therebetween.

Other objects and advantages of the invention will become apparent during the course of the following description.

In the accompanying drawings forming a part of this description and wherein like numerals are employed to desigate like parts throughout the several views, Fig. 1 is a bottom view of one form of grommet, Figs. 2, 3 and 4 are respectively a side elevational sectional and perspective view of the grommet shown in Fig. 1, Fig. 5 is a bottom view of a modified form of grommet, Figs. 6, 7 and 8 are respectively a side elevational, sectional and perspective view of the modified grommet shown in Fig. 4, Fig. 9 is a bottom view of another form of grommet, Figs. 10, 11 and 12 are respectively a side elevational, sectional and perspective view of the grommet shown in Fig. 9, Fig. 13 is a bottom view of a further modified form of grommet, Figs. 14, 15 and 16 are respectively side elevational, sectional and perspective views of the grommet shown in Fig. 13, Fig. 17 is an elevational view of the grommet shown in Fig. 13 as disposed on a metal plate prior to being welded thereto.

Fig. 18 is a sectional view showing this grommet welded to the metal plate,

Fig. 19 is a bottom view of a modified form of grommet,

Figs. 20 and 21 are respectively sectional and perspective views of the grommet shown in Fig. 19, Fig. 22 is a sectional view of the grommets shown in Figs. 1 through 12, as welded to a box section side rail of an automobile chassis, Fig. 23 is a sectional view of the grommet shown in Figs. 19 through 21, as welded to a metal plate, and Fig. 24 is a perspective view of another modified form of grommet.

The embodiment of the invention illustrated in Figs. 1 through 4, comprises a nut 20 preferably of cold rolled steel stock and of any desired shape, herein shown of rectangular cross section, having side walls 21, which taper as at 22 toward the top of the nut. The corners of the nut are chamfered as shown at 24. Projecting centrally from the base of the nut is an annular stud or shank 26 which has a threaded bore 27 extending axially therethrough as well as through the body portion 28 of the nut, and the opposite ends 29 of the threaded bore are countersunk to facilitate assembly of parts thereto.

The base of the nut is provided at the corners thereof with relatively large welding projections 30 each of which has a flat welding surface 31 that extends inwardly from the outer periphery of each chamfered corner 24 and the side walls adjacent thereto in a plane parallel to the recessed portion 33 of the nut and merges with the outer surface of the shank 26 as at 34, at a point short of the extreme outer end of the stud 26 to provide a pilot portion 35 extending from the flat welding surface 31 to the end 37 of the shank 26. The flat welding surfaces 31 have tapered ends 38 that merge with the recessed base portion 33 of the nut.

This nut may be attached to a metal chamber as for example a closed box section side rail 40 of an automobile, partially illustrated in Fig. 22. In this instance it is desired to secure an automobile body not shown to the side rail 40. To facilitate such joining, the wall 41 of the side rail is provided with holes 42 into which the pilot portion 35 of the nut 20 is inserted whereby the flat welding surfaces 31 rest on the outer surface of the wall 41. Upon application of welding current, the welding projections 30 will be almost completely fused or melted into the wall 41, whereby the recessed base portion 33 of the nut 20 rests upon the outer surface of the wall 41 to provide a bearing surface for the nut 20.

The pilot portion 35 of the nut 20 locates and holds the latter in the aperture 42 prior to the welding operation, so that the side rail 40 may be maniplated without danger of dislodging the nut prior to welding. Another feature of the pilot portion 35 is that it prevents the welding projections 30 from flowing into the aperture 42 in the side rail during the welding operation whereby the contour of aperture 42 is not altered. In Fig. 22 the pilot 35 is shown as not extending beyond the inner surface of the wall 41, but if desired it is obvious that the pilot 35 may extend any required distance beyond the side rail wall 41.

The modification of the nut 50 shown in Figs. 5 through 8 is similar in all respects to the preceding modification except for the welding projections 51. Each of these welding projections is disposed at a corner of the nut and has an arcuate welding surface 52 that extends inwardly from the outer periphery of each chamfered corner 24 and the side walls adjacent thereto and merges with the outer surface of the shank 26 as at 34 at a point short of the extreme end of the stud 26 to provide the pilot portion 35 extending from the curved welding projection 51 to the end 37 of the shank 26. The arcuate welding surface 42 has its highest point 53 at the chamfered corner 24 and curves toward the base of the nut to merge at 54 with the recessed portion 33 of the base of the nut 50.

In welding the nut 50 to a perforated metal plate, the pilot 35 is inserted in the opening and the high point 53 of the arcuate welding surface 51 rests upon the metal plate and provides a small path for the initial welding current in comparison with the flat welding surface 31 of the preceding modification. Upon continued application of the welding current the arcuate welding projections are melted and fused to the metal plate so as to cause the recessed base portion 53 of the nut to lie flush with the metal plate.

Another embodiment of the invention is illustrated in Figs. 9 through 12 and comprises a nut 65 alike in all respects to the nut 20 except for the welding projections 66. These projections are of inverted V configuration and extend from the outer periphery of the nut to the pilot 26. The highest point 67 of each welding projection 66 is a continuation of the chamfered corner 24 and slopes downwardly as indicated at 69 to the recessed base portion 33 of the nut 65.

In welding this nut 65 to a perforated metal plate the pilot portion 35 is inserted in an aperture in the plate and the peaks 67 of the welding projections 66 rest upon the plate. Upon initial application of the welding current the peaks 67 concentrate the current whereby the welding projections are rapidly melted and fused into the metal plate so as to cause the recessed base portion 33 of the nut 65 to rest against the metal plate.

In the preceding modifications of the nuts it will be noted that the welding projections extend inwardly from the outer peripheral wall of the nuts to merge with the pilots. I have found that this type of welding projection increases the cross-sectional area of the weld to provide a remarkably strong joint between the plate and nut. A further advantage derived from extending the welding projections to the pilot of the nut is that the life of the forming tools for developing the welding projections is greately increased since the forming tools need not operate between the pilot and the projections to form the latter.

Figs. 13 through 16 illustrate a different type of nut 75 of rectangular cross section having side walls 76, corners 77 and a threaded bore 78. The base 79 of the nut is concaved from the outer walls of the nut inwardly toward the central axis thereof. The bottom edges of the side walls 76 are concaved as shown at 80 due to the concave base 79 and the rectangular shape of the nut. The base of the nut is flattened as shown at 81 at the corners 77 to provide flat welding projections which lie in a plane spaced from the end of the threaded bore 78. The nut is provided with an annular recess 82 spaced inwardly from the arcuate base 79 as shown at 83 to provide a recessed chamber 84 for the accumulation of fused metal during the welding operation, whereby the lowest curved sections 85 of the side walls 76 will rest upon the surface of the plate to which the nut is to be welded.

Figs. 17 and 18 illustrate the manner of welding the nut 75 to an imperforate metal plate 87. To carry out this welding operation, the flat corner welding projections 81 rest on the imperforate metal plate 87, as shown in Fig. 17, and upon application of welding current and pressure the flat welding projections 81 are melted and fused into the plate 87 until the arcuate portions 85 of the side walls 76 rest upon or are welded to the metal plate 87 as shown in Fig. 18. During the welding operation the welding projections 81 and arcuate base 79 adjacent the projections 81 flow, due to the heat developed and pressure applied, and can collect in the recessed chamber 84 which is of sufficient width and depth to accommodate the flowing metal so that the moving metal will not enter or obstruct the bore 78 or interfere with the threads therein.

In Figs. 19 through 21 is illustrated another type of nut 90 which is circular in cross section and is provided with a central threaded bore 91 and an annular welding projection rib 92 concentric with the bore 91 but spaced therefrom. The outer peripheral wall 93 of this welding rib 92 is a continuation of the peripheral wall 94 of the nut 90 and the inner annular wall 96 of the welding rib is inclined downwardly and merges with the recessed base portion 95 at a point 97 remote from the threaded bore 91 to provide an annular chamber 98 adapted to accommodate metal which accumulates during the welding operation.

Fig. 23 illustrates the nut 90 welded to an imperforate metal plate 99. In this welding operation the apex 100 of the annular welding projection 92 initially rests on the surface of the plate 99 and concentrates the welding current at this point so as to rapidly heat up and melt the welding rib 92 whereby the latter is fused into the metal plate 99 to provide a fluid tight seal. It will be noted that the welding rib 92 is spaced a considerable distance from the threaded bore 91 so that the welding projection 92 will not flow into the threaded bore 91 to obstruct or deform the same during the welding operation, nor will the welding heat be easily transmitted to the threaded bore 91 to alter the metallurgical structure and strength of the threads.

In the form of nut shown in Fig. 24, which is similar in many respects to those illustrated in Figs. 1 to 12, the pilot 26' is tapered and the four welding projections 101 are smaller and of triangular shape and are spaced equidistantly around the pilot. The bases of these projections do not extend out to the corners or side edges of the nut, but terminate at points spaced inwardly thereof so as to preclude spreading of fused metal beyond the sides of the nut. The fusing of the projections is like that of the nuts in Figs. 9 to 12, and possesses the additional ability to wedge into the opening into which the tapered pilot wedges, and flow around the pilot to form a gas and liquid tight seal around said opening.

In all of the foregoing modifications, the nuts are preferably made from cold drawn steel of a carbon content or metallurgical structure corresponding with that of the stock to which the nuts are to be attached and are formed to the desired shape in coining and stamping presses or apparatus with the metal cold, which produces a tougher nut than that produced by a screw machine or the like and forms a superior joint with such stock.

It will be understood that the nuts need not be threaded, or of the particular shape herein illustrated, and that various changes in size and arrangement of parts may be resorted to without departing from the spirit of the invention or the scope of the appended claims.

I claim:

1. A body adapted to be welded to a metal member and comprising a polygonal body portion having an opening therethrough, the entire outer portion of the bottom face of said body being concaved from the outer side walls of the body inwardly toward the center thereof leaving the corner portions in the form of welding projections.

2. A body adapted to be welded to a metal member and comprising a polygonal body portion having an opening therethrough, the base of said body being concaved on a substantially spherical section from the outside boundaries of the side walls inwardly toward the center thereof and having the corner portions thereof provided with welding projections extending parallel to the walls of said opening, and said base having a recess concentric with the opening and merging therewith.

3. A welded structure comprising a metal part upon which is disposed a body having a bore and projection means on its base welded to the metal part, said projection means being spaced a substantial distance from said bore, and the base of the body being recessed adjacent the bore to form a depository for the fused metal of the projection means to preclude it from entering and obstructing said bore.

4. A polygonal nut having a tapped opening and its entire outer portion of the bottom face concaved on a substantially spherical section to provide the corners of the nut with depending corner projections to support the bottom face of the nut spaced from its work prior to the projections being welded to the work and which projections are adapted to be fused to the work.

WILLIAM E. SMITH.